Dec. 26, 1939.     J. E. GREENAWALT     2,184,861
FUEL BURNER AND METHOD OF FUEL COMBUSTION
Original Filed Nov. 26, 1935    4 Sheets—Sheet 1

INVENTOR
John E. Greenawalt

INVENTOR
John E. Greenawalt.

Dec. 26, 1939.   J. E. GREENAWALT   2,184,861
FUEL BURNER AND METHOD OF FUEL COMBUSTION
Original Filed Nov. 26, 1935    4 Sheets-Sheet 3

INVENTOR
John E. Greenawalt

Dec. 26, 1939.  J. E. GREENAWALT  2,184,861
FUEL BURNER AND METHOD OF FUEL COMBUSTION
Original Filed Nov. 26, 1935  4 Sheets-Sheet 4
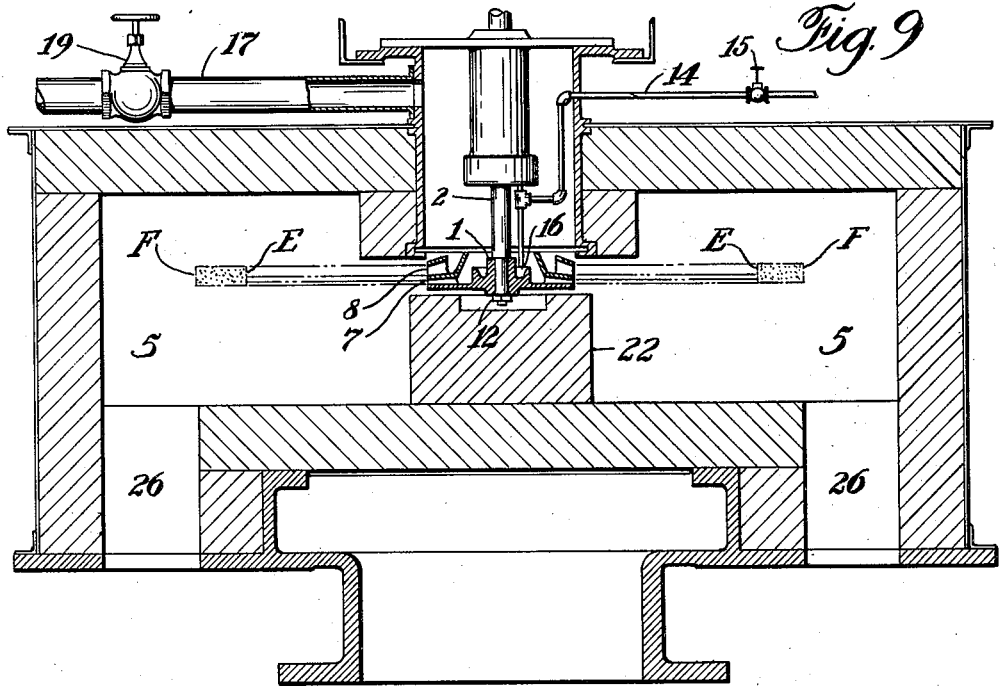
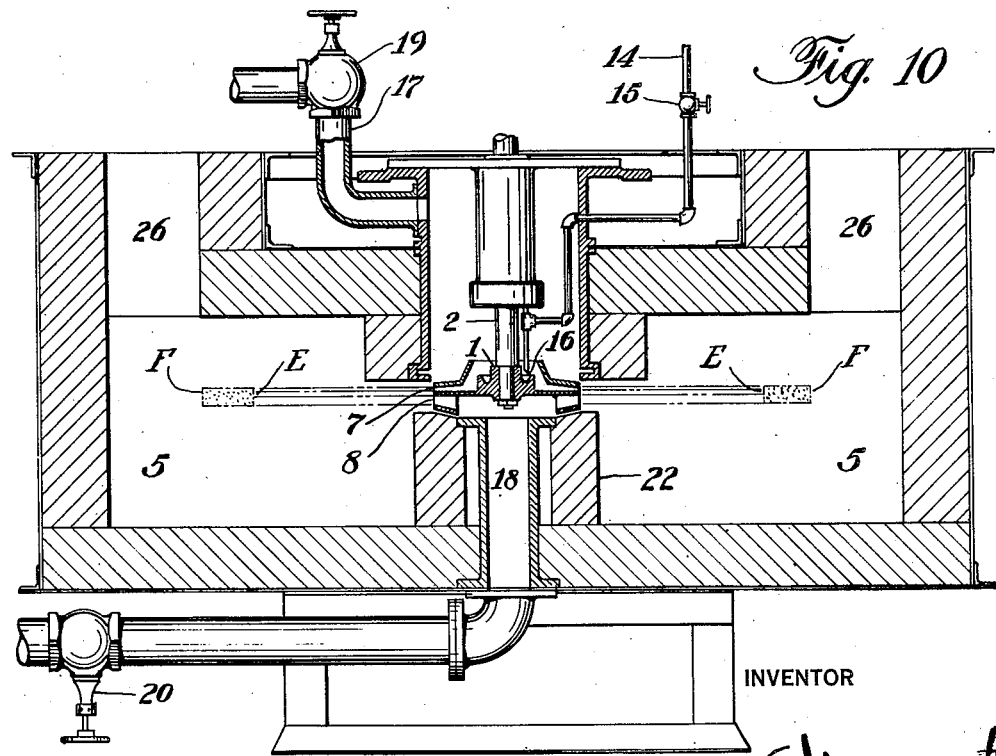
INVENTOR
John E. Greenawalt Patented Dec. 26, 1939

2,184,861

UNITED STATES PATENT OFFICE 2,184,861

FUEL BURNER AND METHOD OF FUEL COMBUSTION

John E. Greenawalt, Bronxville, N. Y.

Application November 26, 1935, Serial No. 51,587
Renewed April 20, 1939

6 Claims. (Cl. 158—77)

My invention relates to improvements in fuel burners, and it consists in the novel features of construction and in the method of fuel combustion more fully set forth in the specification and pointed out in the claims.

This invention is a continuation in part of my two pending patent applications Serial Nos. 685,820 and 685,821, both filed August 19, 1933. Most of the drawings in this application are practically the same as those filed in the two pending applications just mentioned.

Besides the objects of the invention given in my pending applications Serial Nos. 685,820 and 685,821, an object of my invention is to provide a burner which will cause a complete combustion of the fuel, and which permits the ignition of the fuel when it is mixed with primary air only, that is, the fuel is ignited before any substantial quantity of secondary air mixes with the fuel.

Another object of my invention is to have the fuel combustion take place in a predetermined combustion zone within the combustion chamber.

Another object of my invention is to have the combustion of the fuel take place so as to secure high temperatures of combustion.

A further object of my invention is to provide for ignition of the fuel when it is still mixed with only the primary air, but to have secondary air immediately available so that immediate and complete combustion of the fuel takes place.

These objects, as well as others inherent in the invention, will be better apparent from a detailed description of the same in connection with the accompanying drawings.

In the usual type of fuel burner the fuel is mixed with all the air required for complete combustion, and ignition takes place after the fuel has been fully diluted with this air; or fuel and primary air are ignited in a combustion chamber filled with relatively stationary or slow-moving secondary air from which the burning fuel must derive its oxygen for complete combustion.

In practice I have found that in burners heretofore used, combustion occurs slowly resulting in maximum temperatures much lower than in burners of my invention. I have also found that in burners according to my invention I am enabled to secure not only considerably higher temperatures of combustion but also more economy in fuel consumption due to these higher temperatures.

For a more detailed understanding of my invention reference is to be made to the following description and the accompanying drawings of practical embodiments of my inventive idea, and in which drawings,—

Fig. 9 is a view of the burner partly in section of a modified design adapted for a down-draft combustion chamber.

Fig. 10 is a view of the burner partly in section of a modified design adapted for an up-draft combustion chamber.

In this embodiment the fuel and primary air are propelled into the combustion chamber by the upper fan and the secondary air is propelled into the combustion chamber by the lower fan; the secondary air being furnished by the air supply pipe below the burner head.

Similar numerals refer to similar parts throughout the several views.

Figure 1:
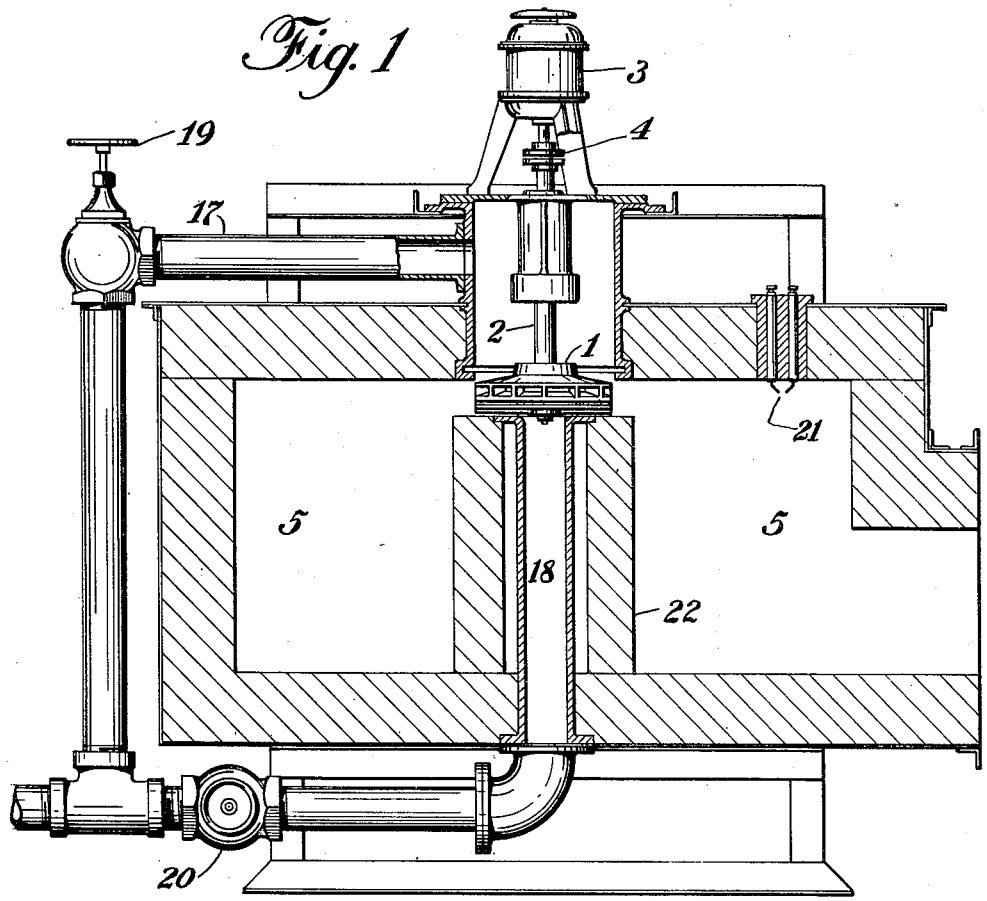
Fig. 1 is a view partly in section of my burner installed within a combustion chamber.

Referring to Fig. 1, I refers to the fuel burner which is mounted upon a vertical shaft 2 and connected by means of coupling 4 to the motor 3. The fuel burner is situated in a combustion chamber 5.

Figure 5:
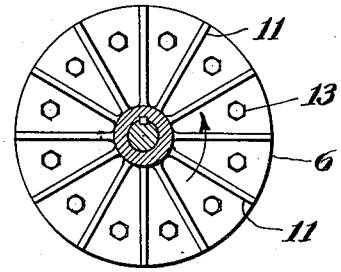
Fig. 5 is a bottom view of the burner taken along line 5—5 of Fig. 2.
Figure 2:
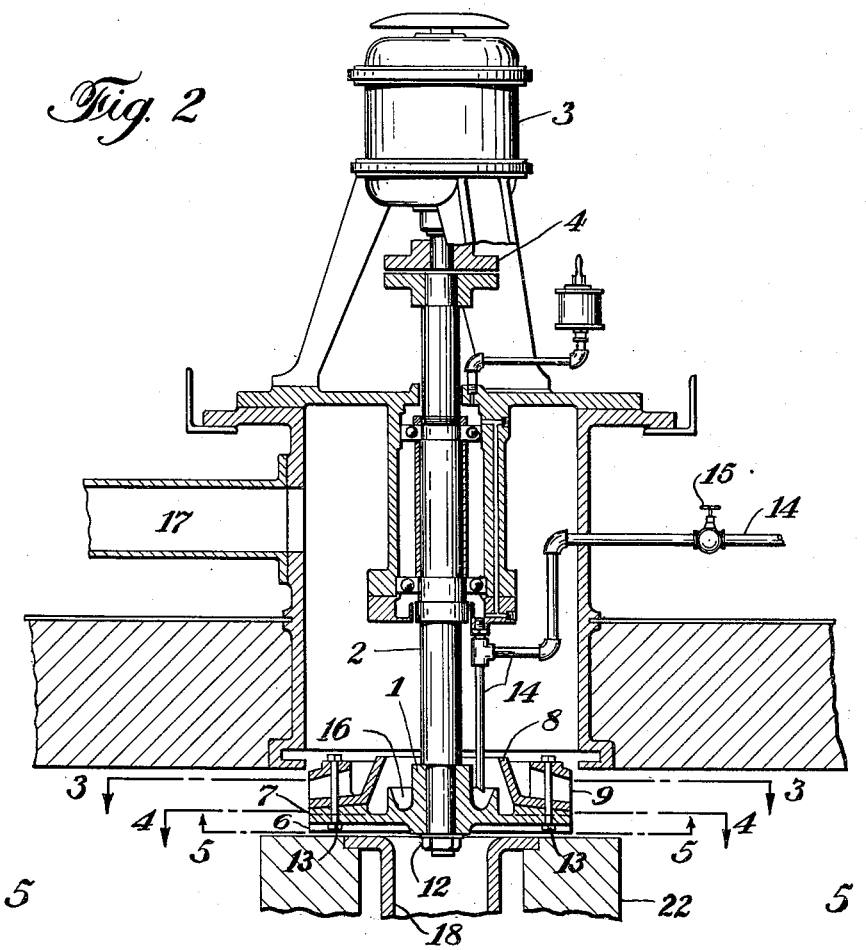
Fig. 2 is an enlarged view of the burner in section, and means for driving it.
Figure 3:
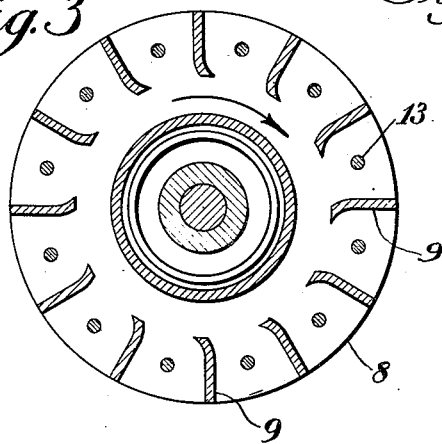
Fig. 3 is a top view to an enlarged scale of a section through the burner taken on the line 3—3 of Fig. 2.
Figure 4:
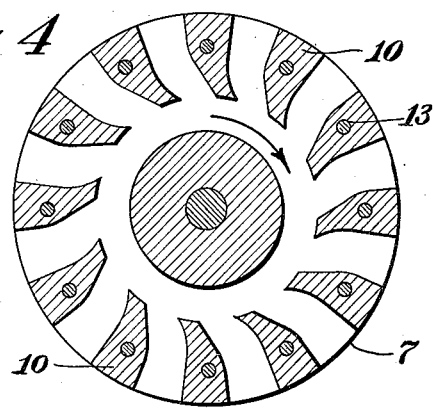
Fig. 4 is a top view of a section through the burner taken along the line 4—4 of Fig. 2, to an enlarged scale.

Fig. 2 shows the mechanism of Fig. 1 to an enlarged scale with only part of the combustion chamber. The fuel burner I contains three superimposed centrifugal fans; a lower fan 6, a middle fan 7, and an upper fan 8. Fig. 3 shows to an enlarged scale a section through the upper fan 8, the blades of which are shown at 9. These blades are radial at their peripheral portions. A section through the middle fan 7 is shown in Fig. 4 to an enlarged scale, and the blades of this fan, which are also radial at their peripheral portions, are shown by 10. A bottom view of the lower fan 6 is shown in Fig. 5 and the blades, which are radial at their peripheral portions are designated by 11. The lower fan 6 and the middle fan 7, I prefer to make in one casting, that is, the blades of fan 6 and fan 7 are carried on a common circular impeller web extending from the periphery of the fan to a hub which is keyed to shaft 2 and secured by nut 12. Therefore the designation 6 refers to the lower part of the impeller web together with its blades 11, and the designation 7 refers to the upper part of the impeller web with its blades 10. The upper fan 8 is held in position by bolts 13 which pass through the impeller bodies of the upper fan 8 and the lower fan 6.

Liquid fuel is supplied to the burner by pipe 14, and the amount is regulated by valve 15, as shown in Fig. 2. For purposes of illustration I have taken fuel oil as representative of any liquid fuel. The middle fan 7 is provided with an oil well 16. The end of pipe 14 is situated directly above this oil well 16, so that the fuel oil upon leaving the pipe fills the oil well, and when the fan is revolving the oil in the oil well as it overflows the outer edge of the oil well is thrown centrifugally in the form of a thin film or spray against the inner diameter of the upper fan 8. Air is introduced through pipe 17, illustrated in Fig. 1, and part of this air enters the middle fan through the annular space between the hub of the middle fan 7 and the inner surface of the upper fan 8 (Fig. 2). The air thus flowing to the middle fan, which I shall call primary air, commingles with the fuel oil so that when it enters the entrance space between the fan blades 10, the fuel oil is thoroughly mixed with the primary air. Due to the shape of the blades 10 of the middle fan, the fuel and primary air are propelled centrifugally into the combustion chamber in the form of a number of jets. These jets are thereby disposed circularly in spaced-apart relation. I prefer making the cross-section of these jets rectangular in shape with the long sides of the rectangle horizontal so as to present a large surface of the jet to the adjacent secondary air.

The rest of the air supplied through pipe 17 passes between the blades 9 of the upper fan 8 and is propelled centrifugally into the combustion chamber preferably in the form of a complete circular, flat ring. The air propelled by the upper fan 8, I shall designate as secondary air.

Through pipe 18 the lower fan 6 is supplied with air which I shall also call secondary air. This air is propelled centrifugally by the fan 6 into the combustion chamber, and again preferably in the form of a complete circular flat ring. The amount of air supplied by the pipes 17 and 18 is regulated by means of the valves 19 and 20.

Figure 7:
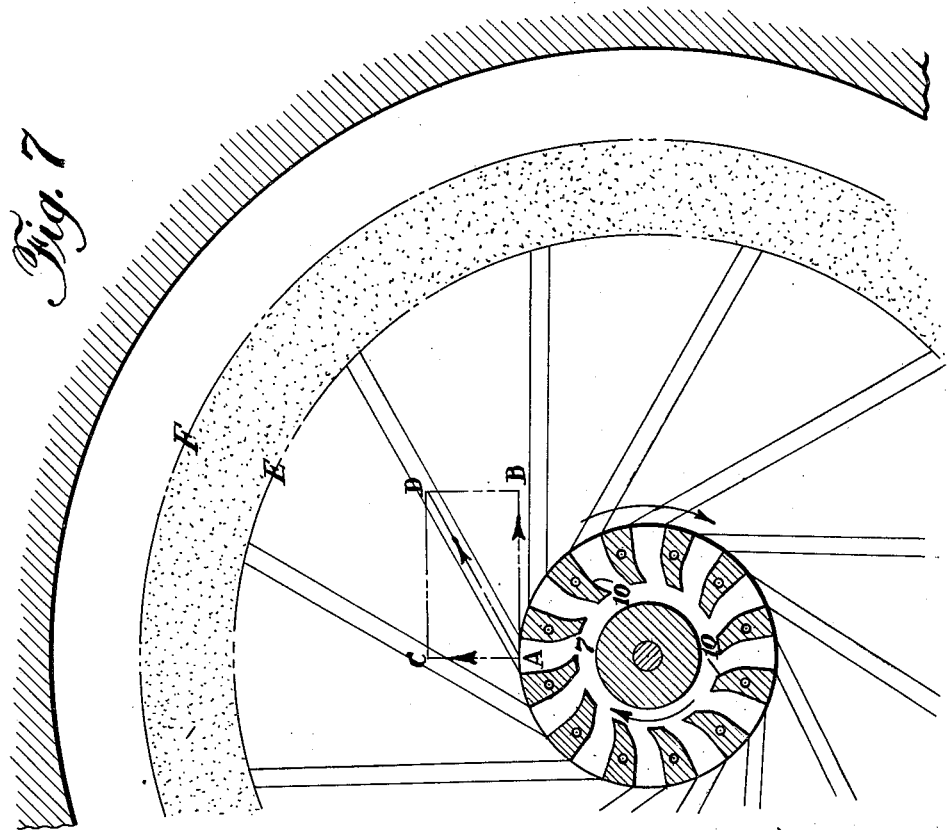
Fig. 7 is a diagrammatic view utilizing a section of the burner shown in Fig. 4 and illustrating the method of fuel combustion.

In Fig. 7 I have shown diagrammatically a representation of the manner in which the primary air and fuel leaves the middle fan 7 in the form of spaced jets. It will be noted that the blades 10 of this fan have a substantial width at the periphery of the fan so as to cause the primary air and fuel to leave the fan in the spaces between the blades in separate jets. Fig. 7 shows the middle fan as having twelve blades and therefore twelve jets are projected into the combustion chamber. As the middle fan revolves at high speed in the direction of the arrow, the initial velocity of the jets is also high. As an example, if the fans of the burner are 16 inches in diameter, and if the motor revolves these fans at 3600 revolutions per minute, the velocity at the periphery of the fan will be approximately 250 feet per second. In Fig. 7 let the line AB represent to some scale this peripheral velocity of the fan at point A, and let the line AC represent to the same scale the relative radial velocity of the fuel and air as it leaves the fan at point A, then the resultant diagonal AD will represent to the same scale the absolute exit velocity of the jet at point A. The diagonal AD is longer than the line AB, and hence, the jets of primary air and fuel leave the middle fan at velocities greater than 250 feet per second. The length of these lines are shown only diagrammatically and do not represent true values. Line AD also represents the direction of the jet as it leaves the space A between the blades of the fan. Naturally as the fans are rotating at 60 revolutions per second these jets also rotate at the same rate. The secondary air is propelled into the combustion chamber by the upper fan 8 and the lower fan 6 at speeds equal to and in a direction approximately similar to the speed and direction of the jets, however the secondary air does not leave these fans 8 and 6 in the form of jets as does the primary air from fan 7 but is propelled into the combustion chamber in the form of a continuous ring-like disc, that is, the secondary air is discharged from the upper fan 8 and the lower fan 6 so as to form two layers of moving air one immediately above and one below the jets of fuel and primary air as they emanate from the middle fan so that they blanket the jets of primary air and fuel, to keep any products of combustion or the like from these fuel jets, and although the secondary air is propelled adjacent to the jets, the secondary air does not commingle in any substantial amount with the primary air and fuel until it reaches a ring-like space in which complete combustion takes place and which shall hereafter be designated as the zone of combustion, whose boundaries are designated as E and F in Fig. 7. In order to have the secondary air leave the respective fans in a direction approximately similar to the direction of the movement of the jets of primary air and fuel, the blades of the fans propelling the secondary air are constructed so that said blades are radially directed at their exit ends as are also the blades of the fan propelling the primary air and fuel. In order that the secondary air may be propelled into the combustion chamber at a velocity approximately equal to the velocity of movement of the jets of primary air the diameters of the fans 8 and 6 propelling the secondary air being equal to the diameter of the fan 7 propelling the primary air and fuel.

As the jets of primary air and fuel and the secondary air leave the respective fans and enter the combustion chamber, their velocities are constantly decreased so that when they reach the inner circle of the combustion zone, designated by E, their velocities have diminished to the velocity of flame propagation. At this velocity the fuel is ignited either by an electrical spark gap 21 (Fig. 1) or it can be ignited manually by means of a torch. The fuel in burning not only takes its oxygen from the primary air but also from the adjacent and surrounding secondary air moving with it. As all the secondary air necessary for complete combustion is propelled above and below the jets containing fuel, there is always enough oxygen immediately available for complete combustion. This creates a ring-like zone of combustion of rather small extent because the fuel burning is immediate. This ring-like zone of combustion is diagrammatically represented between the inner limit E and outer limit F. I have found experimentally that due to this immediate and complete combustion, I secure considerably higher maximum temperatures than I have secured by present types of fuel burners. It will be noted that this combustion zone is spaced from the wall of the combustion chamber, as is also shown in Figs. 9 and 10.

The speed of flame propagation varies considerably and is dependent upon the temperature, pressure, density, and the kind of fuel employed. I have found in practice that the speed of flame propagation varies in the combustion chamber from about 40 feet per second to 100 feet per second. It should be noted that the combustion zone is located within the combustion chamber but not in contact with either the walls of the combustion chamber or any stationary part of the chamber. That is, the fuel, before it is burned, does not impinge on or come in contact with any stationary surface in the combustion chamber.

The location of the zone of combustion within the combustion chamber with respect to the burner itself can be varied between wide limits in a number of ways. If it is desired to have the zone of combustion enlarged, that is further away from the fans, the diameter of the fans can be increased, or the motor speed increased, which in turn increases the speed of the fans, either of which methods increases the initial velocity of the jets of primary air and fuel, and of the secondary air. The combustion zone can also be enlarged in diameter by increasing the pressure of the air supply in the pipes 17 and 18 thereby increasing the initial velocity of the jets of primary air and fuel and of the secondary air.

The secondary air supplied by the burner should be in sufficient quantity so as to insure complete combustion of the fuel, but should not be greatly in excess thereof, because with a given amount of fuel, maximum temperatures can only be reached by rapid burning and having a minimum of excess air so that the heat made available by combustion is utilized in the furnace at the highest temperature. As is well known, the greater the range of temperatures in which a heat cycle operates, the higher the efficiency of heat utilization. It is therefore necessary for good economy to have the combustion of the fuel take place at as high a temperature as is possible.

The amount of primary air used in any particular case depends on three factors. It should be sufficient in amount to carry along the desired amount of fuel to be burned. It also should be sufficient in amount to permit of fuel ignition. It should not be in such excess that it will so dilute the fuel as to make the ignition of the fuel difficult or to slow down the burning of the fuel.

Figure 6:
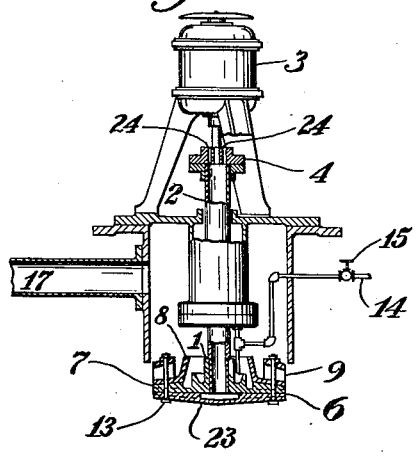
Fig. 6 is a side view of another embodiment of my invention partly in section.

In Fig. 6 I have shown another embodiment of my invention. In this embodiment the combustion chamber does not have a centrally located pillow block 22 (Fig. 1) nor the secondary air supply pipe 18 for the lower fan. In order to supply secondary air to the lower fan 6 of Fig. 6, I have added below the blades of the lower fan a protecting cover plate or shield 23, and have made shaft 2 hollow. Holes 24 are provided in the upper half of the coupling 4 through which secondary air is introduced into the hollow shaft 2, which in turn allows this secondary air to reach the lower fan 6. The secondary air flowing to fan 6 also aids in cooling the bottom plate 23, so that when it is exposed to the heat of burning fuel, as it is in sintering processes or similar heat producers, this cold air prevents the bottom cover 23 from being melted by the heat below it.

Figure 8:
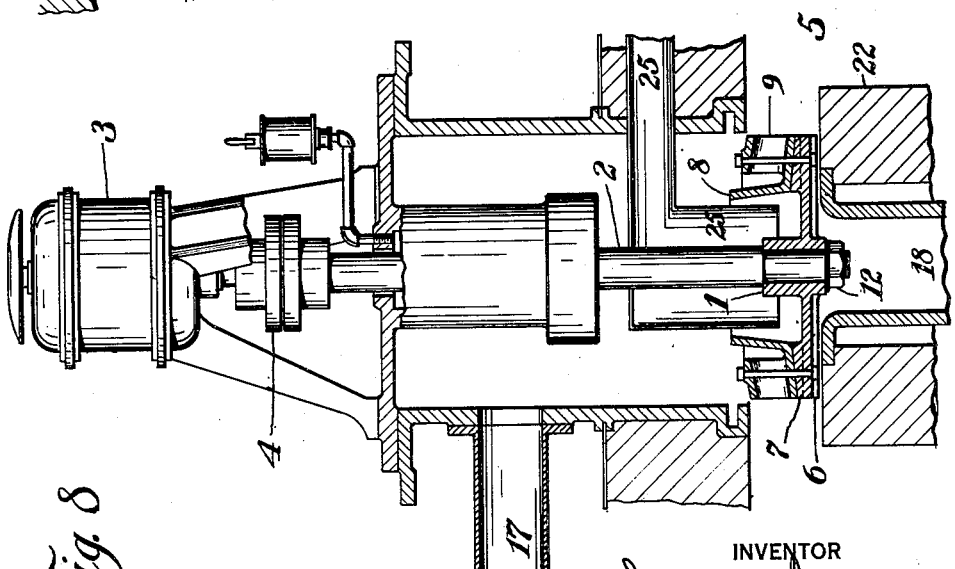
Fig. 8 is a side view of another embodiment of my invention partly in section, for the burning of natural gas or pulverized fuel, such as coal.

In Fig. 8, I have shown my fuel burner adapted for the use of pulverized coal or natural gas as the fuel. All parts shown in Fig. 8 are practically the same as in Fig. 2 with the exception that the fuel oil pipe 14 of Fig. 2 has been omitted and in its place is a supply conduit 25 for introducing either powdered coal or natural gas into the middle fan.

In using powdered coal, a sufficient quantity of primary air is blown into the conduit 25 combined with coal so as to easily carry the coal particles to the middle fan. In using natural gas as the fuel, the primary air is mixed with the gas as it enters conduit 25. It will also be noticed that an additional small amount of primary air enters the middle fan through the clearance space between the conduit 25 and the inner surface of fan 8. Oil well 16 of Fig. 2 has, of course, been omitted in the burner shown in Fig. 8.

Although I prefer to use three superimposed fans, only two superimposed fans can be used, one of which propels fuel and primary air in the form of jets into the combustion chamber, and the other propels all the secondary air necessary for complete combustion of the fuel in the form of a layer of air immediately adjacent to the jets. If the combustion chamber is a downdraft chamber it is preferable, when using only two fans, to have the secondary air in a layer immediately above the fuel and air jets; and if the combustion chamber is an updraft chamber it is preferable, when using only two fans to have the secondary air in a layer immediately below the fuel and air jets. Fig. 9 shows a two fan burner arranged in a downdraft combustion chamber as above described. The fan 8 propels secondary air as a layer immediately above the primary air and fuel jets propelled by fan 7. After the jets and secondary air have decreased in velocity equal to or less than that of flame propagation, the fuel is ignited and burned in the combustion zone whose boundaries are designated by E and F. The heated products of combustion are drawn downward and pass out through the ring opening 26 at the bottom of the combustion chamber.

Fig. 10 shows a two fan burner arranged in an up-draft combustion chamber as above described. In this case fan 8 propelling the secondary air into the combustion chamber is arranged below the fan 7 propelling the primary air and fuel into the combustion chamber. When the velocity of the jets of primary air and fuel decreases until that velocity is equal to the velocity of flame propagation, the fuel is ignited and burned in the combustion zone whose boundaries are designated by E and F. The heated products of combustion are drawn upward and pass out through the ring opening 26 at the top of the combustion chamber.

In accordance with the provisions of the patent statutes, I have described the principle of operation of my invention together with the apparatus which I now consider to represent the best embodiments thereof; but I desire to have it understood that the apparatus shown is only illustrative, and that the invention can be carried out by other means.

What I claim as new and desire to secure by Letters Patent of the United States, is:

1. A fuel burner having three superimposed fans, an upper, a middle and a lower fan, each with uniformly spaced blades, the blades of the middle fan having a height less than the space between the blades and adapted to eject at their peripheral portions fuel and air in the form of a plurality of jets of greater width than depth, means for supplying the middle fan with fuel and primary air necessary for atomizing the fuel, means for supplying the upper and lower fans with sufficient secondary air for the complete combustion of the fuel, the blades of all the fans being radial at the peripheries of the fans, all the fans having the same peripheral diameter, and means rotating the fans at a speed sufficiently high to propel the fuel and air from the middle fan and air from the other fans to a predetermined distance from the peripheries of the fans at a velocity greater than that of flame propagation.

2. A fuel burner having three superimposed fans, an upper, a middle and a lower fan, each with a plurality of circularly disposed and uniformly spaced blades, all blades being radial at their peripheral portions, and the fans having the same peripheral diameter, the blades of the middle fan being wedge shaped with the thick end of the wedge at the periphery of said fan and the fans having a height less than the space between the blades and adapted to eject at their peripheral portions fuel and air in the form of a plurality of ribbon-like jets of greater width than depth, the blades of the other two fans being of uniform thickness throughout and adapted to eject at their peripheries additional air necessary for complete combustion of the fuel, a combustion chamber having walls within which the fuel burner is installed, a motor for driving the fans at a speed sufficiently high to propel the fuel and all the air into the combustion chamber at a velocity greater than that of flame propagation and to a predetermined distance from the fuel burner before combustion takes place, the walls of the combustion chamber being at a distance beyond the space in which combustion takes place.

3. In a furnace, a combustion chamber having walls surrounding a free combustion zone, means for centrifugally projecting into said chamber at a velocity higher than that of flame propagation whirling ribbon-like jets composed of a mixture of fuel and primary air and lying in the same plane, and means for centrifugally projecting into said chamber two ring shaped layers of secondary air adjacent to, parallel to, in a direction similar to, and with the same velocity as the jets, one layer above and one layer below said jets, whereby complete combustion of the fuel takes place in the free combustion zone without contact with the walls of said combustion chamber.

4. In a furnace, a combustion chamber having walls surrounding a free combustion zone, means for centrifugally projecting into said chamber, at a velocity higher than that of flame propagation, whirling ribbon-like jets composed of a mixture of fuel and primary air and lying in the same plane, and means for centrifugally projecting into said chamber a ring shaped layer of secondary air immediately above and adjacent to, parallel to, in a direction similar to, and with the same velocity as the jets, whereby complete combustion of the fuel takes place in the free combustion zone without contact with the walls of said combustion chamber.

5. A method of burning fuel, consisting of introducing the fuel into a combustion chamber by first mixing the fuel with primary air and then projecting the mixture at velocities greater than that of flame propagation into the combustion chamber in the form of a plurality of rectangular jets of greater width than depth, whereby the jets present a large exposed surface as they are whirled into the combustion chamber, and of simultaneously and independently projecting a sufficient quantity of secondary air necessary for complete combustion of the fuel into the combustion chamber above and below adjacent to, parallel to, in a direction similar to, and with the same velocity as the jets thus preventing adulteration of the fuel with the products of combustion existing in the combustion chamber by having the secondary air form a protective layer between the fuel and said products of combustion the said velocity being such that finally at a predetermined distance away from the fuel and air projecting means, where the velocity of the fuel and air jets and the velocity of the secondary air have decreased to a velocity less than that of flame propagation, the fuel is ignited and is rapidly and completely burned in a free and open space without coming in contact with any stationary part within the combustion chamber.

6. The method of burning fuel, which consists in subjecting the unburned fuel to a movement having a velocity greater than that of flame propagation, while said unburned fuel is disposed in circularly disposed spaced jets of air of ribbon-like section and of equal velocity and direction and under the action of centrifugal forces, during which movement no combustion of the fuel takes place, subjecting said jets to protective layers of additional air above and below said jets of fuel and air sufficient for the complete combustion of the fuel and having substantially the same velocity and similar direction of movement as that of the jets, and igniting and burning said fuel in the presence of said additional layers of air when the velocities of the jets decrease to flame propagation velocity in a free and open combustion zone without coming in contact with any stationary part.

JOHN E. GREENAWALT.